United States Patent [19]
Rancich et al.

[11] Patent Number: 6,086,996
[45] Date of Patent: *Jul. 11, 2000

[54] ETHYLENE-PROPYLENE COPOLYMER LOW NOISE FILM ADDITIVE

[75] Inventors: Michael J. Rancich, Mundelein, Ill.; Jack Shirrell, Acworth, Ga.

[73] Assignee: Illinois Tool Works Inc., Glenview, Ill.

[ * ] Notice: This patent issued on a continued prosecution application filed under 37 CFR 1.53(d), and is subject to the twenty year patent term provisions of 35 U.S.C. 154(a)(2).

[21] Appl. No.: 08/728,967

[22] Filed: Oct. 11, 1996

[51] Int. Cl.⁷ ..................................... B32B 27/32
[52] U.S. Cl. .................. 428/355 EN; 428/515; 428/516; 264/173.19; 264/291; 525/240
[58] Field of Search ............. 525/240; 428/355 EN, 428/515, 500, 516; 264/173.19, 291

[56] References Cited

U.S. PATENT DOCUMENTS

| | | | |
|---|---|---|---|
| 4,110,414 | 8/1978 | Lindsay | 525/240 |
| 4,123,417 | 10/1978 | Finberg | 524/451 |
| 4,311,808 | 1/1982 | Su | 525/222 |
| 4,430,457 | 2/1984 | Dobreski | 523/100 |
| 4,518,654 | 5/1985 | Eichbauer et al. | 428/331 |
| 4,587,303 | 5/1986 | Turtle | 525/240 |
| 4,624,991 | 11/1986 | Haas | 525/209 |
| 4,680,330 | 7/1987 | Berier et al. | 524/230 |
| 4,793,956 | 12/1988 | Nogiwa et al. | 264/41 |
| 4,816,517 | 3/1989 | Wilkus et al. | 525/194 |
| 5,032,463 | 7/1991 | Smith | 428/520 |
| 5,114,763 | 5/1992 | Brant et al. | 428/34.9 |
| 5,147,709 | 9/1992 | Dohrer et al. | 428/213 |
| 5,241,030 | 8/1993 | Barry et al. | 526/248.1 |
| 5,306,549 | 4/1994 | Isozaki et al. | 428/220 |
| 5,306,745 | 4/1994 | Herran et al. | 523/205 |

FOREIGN PATENT DOCUMENTS 2038845  7/1980  United Kingdom .

*Primary Examiner*—Leszek Kiliman
*Assistant Examiner*—D. Lawrence Tarazano
*Attorney, Agent, or Firm*—Pauley Petersen Kinne & Fejer

[57] ABSTRACT

The invention pertains to an ethylene-propylene copolymer which when added to stretch film used in palletizing reduces the noise involved in use. The ethylene-propylene copolymer tackifier has a weight average molecular weight in the range of 7,000 to 18,000 and an ethylene content of 15–28 weight percent and results in polyethylene stretch films having both desirable cling and noise levels.

30 Claims, No Drawings

ETHYLENE-PROPYLENE COPOLYMER LOW NOISE FILM ADDITIVE

BACKGROUND OF THE INVENTION

1. Field of the Invention

This invention is concerned with blends of linear low density polyethylenes and ethylene propylene co-polymers and with low unwind noise, good cling, and commercially viable tackifier bleed-out rates and films made from them.

2. Description of the Prior Art

U.S. Pat. No. 4,430,457 discloses a stretch wrap film, but does not address the object of achieving low noise.

U.S. Pat. No. 5,114,763 discloses a stretch film having a tackifying agent, a hydrogenated cycloaliphatic hydrocarbon, which is substantially different from the ethylene-propylene copolymers of this invention.

U.S. Pat. No. 4,793,956 discloses a process for preparing a porous film or sheet having a filler. Good cling and low noise is not discussed as an object of the '956 patent.

BRIEF SUMMARY OF THE INVENTION

The invention relates to a linear low density polyethylene (LLDPE) stretch film used in palletizing and packaging. The invention is drawn to a film with low noise properties due to the particular characteristics of the blend of a LLDPE resin with a low molecular weight EP copolymer having a low percentage of ethylene, as a tackifying agent The invention provides blends, and films made therefrom, comprising a linear low density polyethylene containing by weight of the blend, between 3% and 6% of an ethylene-propylene copolymer having an ethylene content of between 15% to 28% weight percent and weight average molecular weights of between 7289 and 60615, preferably between about 7000 to about 18,000.

The invention provides for making stretch films with low noise, good cling, and commercially viable bleed-out rates of the tackifying agent An object of the invention is to provide a film with low noise when unwound during the stretch wrapper operation.

A further object of the invention is to provide a film with low noise and good cling.

A further object of the invention is to provide a film with low noise that has commercially viable bleed-out rate.

DESCRIPTION OF THE PREFERRED EMBODIMENTS

Tests were conducted using Eastoflex 1003, Eastoflex E1010, Uniroyal Trilene CP40-38, and Polytech PX4 as tackifying agents added to the LLDPE mixture. The results of these texts are summarized in Tables 1–4.

Table 1 highlights the differences in the ethylene-propylene copolymer properties. The Eastman 1003 and the Uniroyal Trilene CP40-38 both have relatively low molecular weights of between 2100 and 2500. Both the Eastman 1003 and the Uniroyal Trilene CP40-38 have low polydespersity indices (Q) of between 2.9 and 5.6 compared to the other EP's tested. The weight average molecular weights of the Eastman 1003 and Uniroyal Trilene CP40-38 are lower than the PX-4 and E1010 tested. The ethylene contents of the Eastman 1003 and Uniroyal Trilene CP40-38 are between 20 to 28% and slightly overlap the Polytech PX-4.

TABLE 1

EP PROPERTIES

| Manufacturer | Grade | Molecular Weight by GPC | | | Ethylene Content | Melt Index |
| --- | --- | --- | --- | --- | --- | --- |
| | | Mn | Mw | Q | (%) by FTIR | (g/10 min) |
| Eastman | Eastoflex E1003 | 2140 | 11810 | 5.52 | 22 | >207 |
| Eastman | Eastoflex E1010 | 2910 | 19960 | 6.86 | 9 | |
| Polytech | PX-4++ | 2070 | 20620 | 9.96 | 28 | |
| Uniroyal | Trilene CP40-38 | 2470 | 7290 | 2.95 | 26 | |

++-EP extracted with hexane

Table 2 highlights test formalities 1 through 4 which were run. Tests 1–4 highlight monolayer films extruded on a laboratory blown film line. The base resin in all cases is a butene comonymer linear low density polyethylene. In Examples 1–4, the tackifying agents were used at or near their lowest effective levels. Cling was recorded at 200% stretch at different time intervals for 28 days. Exxan Parapol 1300 is a polybutene teckifier additive well known in the art. It is an effective tackifier. However, when used in moderate levels, it produces fairly high unwind noise. As shown in Example 1, the polybutene tackifier developed relatively high cling within three days, but this was accompanied with very high noise. Polytech PX-4 concentrate was used at a level of 10% in the film. The effective loading of ethylene-propylene copolymer was 5.5%. The film had very low noise. However, there was no measurable cling until 14 days and there was not adequate cling until 28 days. Trilene CP40-38 developed effective cling after 1 day of aging and had no noise. The Eastman E1003 also produced a film with no noise and effective cling after 3 days of aging.

TABLE 2

TESTS 1–4: MONOLAYER FILMS

| Test # | 1 | 2 | 3 | 4 |
| --- | --- | --- | --- | --- |
| Composition (% by weight) | | | | |
| butene LLDPE | 96 | 90 | 95 | 95 |
| Exxon Parapol 1300 | 4 | | | |
| PX-4 Concentrate* | | 10 | | |
| Trilene CP40-38 | | | 5 | |
| Eastman E1003 | | | | 5 |

TABLE 2-continued

TESTS 1–4: MONOLAYER FILMS

| Test # | | 1 | 2 | 3 | 4 |
|---|---|---|---|---|---|
| | | Test Results | | | |
| Noise | | High | None | None | None |
| Cling @ | 1 day | 60 | 0 | 175 | 90 |
| 200% | 3 days | 185 | 0 | 175 | 120 |
| (grams) | 7 days | 280 | 0 | 200 | 130 |
| | 14 days | 340 | 40 | 200 | 130 |
| | 28 days | 260 | 100 | 206 | 110 |

*-5.5% EP Copolymer in LLDPE

Table 3 shows tests 5–8 comparing Eastman E1003 and Eastman E1010 at 4 and 6% loadings. In tests 5 and 6, the Eastman E1003 developed an effective cling within a reasonable 7 days. Again, there was no loise. In tests 7 and 8, the Eastman E 1010 at both 4 and 6% loadings also had no noise and no cling after 28 days of aging. The Eastman E1010 at both 4 and 6% loadings was found to be unacceptable due to very slow tack development.

TABLE 3

TESTS 5–8: MONOLAYER FILMS

| Test # | | 5 | 6 | 7 | 8 |
|---|---|---|---|---|---|
| | | Composition (% by weight) | | | |
| butene LLDPE | | 96 | 94 | 96 | 94 |
| Eastman E1003 | | 4 | 6 | | |
| Eastman E1010 | | | | 4 | 6 |
| | | Test Results | | | |
| Noise | | None | None | None | None |
| Cling @ | 1 day | 0 | 20 | 0 | 0 |
| 200% | 3 days | 40 | 60 | 0 | 0 |
| (grams) | 7 days | 105 | 105 | 0 | 0 |
| | 14 days | 145 | 145 | 0 | 0 |
| | 28 days | 135 | 190 | 0 | 0 |

Table 4 shows tests 9 and 10 which are coextruded films produced on a commercial scale blown film equipment. Both tests are ABA coextrusions (the composition of the two skin layers are identical). Test 9 is a polybutene tackified film containing a total of 3.5% polybutene. The polybutene is present in both the skin and the core layers. This film has good levels of cling at 135 grams but had very high noise (89 dB). The second film contains Eastman E1003 at a total loading of approximately 4.5%. The E1003 was added in the form of a concentrate which was 40% ethylene-propylene copolymer in LLDPE. This film had very low noise at 70 dB and good cling at 150 grams.

TABLE 4

TESTS 9 AND 10: COEXTRUDED FILMS

| Test # | 9 | 10 |
|---|---|---|
| Composition (% by weight) | | |
| Skin Layers (18% each) | | |
| butene LLDPE | 86.4 | 71.8 |
| LDPE | 9.8 | 10 |
| Parapol 1300 | 4.0 | |
| Eastman E1003 | | 6.9 |
| Hexene LLDPE-E1003 carrier | | 11.3 |
| Trilene CP40-38 | | |
| Core Layer (64%) | | |
| hexene LLDPE | 96.8 | 91.8 |
| Parapol 1300 | 3.2 | |
| Eastman E1003 | | 3.1 |
| Hexene LLDPE-E1003 carrier | | 5.1 |
| Trilene CP40-38 | | |
| Total Tackifier (%) | 3.5 | 4.5 |
| Test Results | | |
| Noise LEQ (dB) | 89 | 70.1 |
| Cling @ 200% (grams) | 135 | 150 |

These tests show the difference in low noise tackifier performance between different ethylene-propylene copolymers. The EP copolymers of our invention (Trilene CP40-38 and Eastman E1003) provide low unwind noise and good cling development in 3–7 days. Other available EP copolymers (Eastman E1010 and the Polytech PX-4) also provide low noise, but require 14–28 days to develop adequate cling. Polybutene tackified films are also included for comparison as they are widely used in industry. Polybutene tackified films develop high levels of cling rapidly with high unwind noise.

EXAMPLE ONE

In Example One, an EP copolymer, trade name Eastman E1003, with a number average molecular weight ($M_n$) of 2142, a weight average molecular weight ($M_w$) of 11812, a "Z" average molecular weight ($M_z$) of 40158, a polydispersity index ($Q=M_w/M_n$) of 5.51, an ethylene content by percentage of 22% and a melt index (MI) of >207 grams/10 min. is added to LLDPE stretch film. The Eastman E1003 has been used in the prior art as a hot melt additive and not as a film tackifying agent. A monolayer film would consist of 4–6% of the Eastman E1003 EP copolymer while the remaining 96–94% of the film is comprised of butene comonymer LLDPE. These films had no unwind noise and had adequate cling 3 days after extrusion.

A coextruded film consists of two skin layers and one core layer. In a coextruded film form each skin layer comprises 18% of the whole film form and the core layer comprises 64% of the whole film form. The entire coextruded film form is made up of 4.5% of the EP copolymer. The Eastman E1003 EP copolymer comprises 6.9% of each skin layer and 3.1% of each core layer. The base resin of a butene comonymer LLDPE makes up the remaining percentage of the film.

In the situation where Eastman E1003 comprises 4.5% of the coextruded film structure, the properties of Eastman E1003 reduce the noise that the film makes upon stretching to 70 dB, or approximately 20 dB lower than polybutene tackified films.

EXAMPLE TWO

Blends were made of a butene comonymer LLDPE and an EP copolymer concentrate, Polytech PX-4. The EP copolymer in PX-4 has a $M_n$ of 2073, a $M_w$ of 30615, a $M_z$ of 146380, a Q of 9.94, and an ethylene content of 28%. PX-4 was added to the butene comonymer LLDPE stretch film. The blend consisted of 5.5% by weight of Polytech PX-4 in a monolayer stretch film.

The results of testing done on the Polytech PX-4 and LLDPE blend stretch film showed a reduction in noise of the film upon peeling from the roll and an increase in cling. Testing of this embodiment also revealed that higher loads or concentrations of the Polytech PX-4 were needed to produce the same good cling properties as the other embodiments discovered of this invention. In order to produce the same good cling as the other embodiments of this invention, the percentage by weight of the Polytech PX-4 was increased to 10% by weight of the blend. At such an increased percentage, the Polytech PX-4 exhibits 100 grams cling at 200% stretch in approximately 27 days after the stretch film is blown. The Polytech PX-4 does not develop adequate cling at this percentage by weight until between 14 and 28 days after extrusion.

EXAMPLE THREE

In Example Three, a blend of a LLDPE and an EP copolymer, tradename of Trilene CP40-38, with a $M_n$ of 2471, a $M_w$ of 7289, a $M_z$ of 4630, a Q of 2.95, and an ethylene content of 26% by weight was added to the LLDPE to form a blend. The blends consist of between 4–6% by weight of the Trilene CP40-38 in a monolayer of the stretch film formula or 4 to 5% of the Trilene CP40-38 in a coextruded film formula. At such percentages by weight, the EP copolymer-stretch film blend exhibited a reduction in peel-off roll noise compared to polybutene tackified film and an increase in cling.

A coextruded film with 3.5% by weight of the Trilene at 200% percent stretch, the noise level of the peel-off was significantly reduced to approximately 65–68 dB. At 5% by weight of the Trilene CP40-38, in a monolayer film exhibited good cling after one day. The cling at 200% remained consistent at approximately 200 grams from approximately 7 days after the film was blown. Trilene EP40-38 exhibits excellent noise reduction at lower percentages by weight than other embodiments discovered of this invention.

EXAMPLE FOUR

In Example Four, a blend of LLDPE and an EP copolymer, tradename of Eastman E1010, with a $M_n$ of 2912, a $M_w$ of 19955, a $M_z$ of 69055, a Q of 6.85, and an ethylene content of 9% by weight was added to the LLDPE stretch film to form a blend. The blends consist of between 4–6% by weight of the Eastman E1010 in a monolayer of the stretch film formula. At such percentage by weight, the EP polymer-stretch film blend exhibited a reduction in peel-off roll noise and no increase in cling.

The Eastman E1010 exhibited the lowest cling of any of the other embodiments of the invention disclosed. At 4% and 5% by weight of the Eastman E1010, the stretch film had 0 grams at 200% stretch after 28 days. Such cling development was significantly lower than any of the other embodiments. Due to its and the Polytech PX-4 relatively higher weight average molecular weights from the other embodiments, these additives did not bleed-out or migrate to the skin layers as quickly as the Trilene CP40-38 or the Eastman E1003.

Tackifying agents which are found to be unacceptable due to either high noise or low cling are the Eastman E1010, the Polytech PX-4, and polybutene as a tackifying agent.

We claim:

1. A low noise stretch film comprising a blend of polyethylene in combination with an ethylene-propylene copolymer tackifier having an ethylene content of 15–28% by weight and a weight average molecular weight of about 7000 to about 18,000.

2. The stretch film of claim 1, wherein the polyethylene comprises linear low density polyethylene.

3. The stretch film of claim 2, wherein the linear low density polyethylene comprises a butene comonomer.

4. The stretch film of claim 2, wherein the linear low density polyethylene comprises a hexene comonomer.

5. The stretch film of claim 1, wherein the blend comprises about 3.5–5.5% by weight of the ethylene-propylene copolymer.

6. The stretch film of claim 1, wherein the ethylene-propylene copolymer has a polydispersity index of about 2.9–10.

7. The stretch film of claim 1, wherein the ethylene-propylene copolymer has a polydispersity index of about 2.9–5.6.

8. The stretch film of claim 7, wherein the ethylene-propylene copolymer has an ethylene content of about 20–28% by weight.

9. The stretch film of claim 1, wherein the ethylene-propylene copolymer tackifier has a weight average molecular weight of about 7,000 to about 12,000.

10. The stretch film of claim 1, wherein the ethylene-propylene copolymer has a number average molecular weight of about 2000–2300, a weight average molecular weight of about 8000–15,000, a polydispersity index of about 4–10, and an ethylene content of about 15–24% by weight.

11. The stretch film of claim 1, wherein the ethylene-propylene copolymer has a number average molecular weight of about 2300–2600, a weight average molecular weight of about 6000–8000, a polydispersity index of about 2.9–4.0, and an ethylene content of about 24–28% by weight.

12. The stretch film of claim 1, wherein the ethylene-propylene copolymer has a melt-flow index exceeding 200.

13. The stretch film of claim 1, wherein the ethylene-propylene copolymer tackifier has an ethylene content of 20–28% by weight.

14. The stretch film of claim 1, wherein the blend comprises about 3–6% by weight of the ethylene-propylene copolymer tackifier.

15. A low noise multilayer stretch film having first and second outer layers, wherein at least one of the outer layers comprises a blend of polyethylene in combination with an ethylene-propylene copolymer tackifier having an ethylene content of 15–28% by weight and a weight average molecular weight of about 7000 to about 18,000.

16. The multilayer stretch film of claim 15, wherein the ethylene-propylene copolymer tackifier has a weight average molecular weight of about 7000 to about 12,000.

17. The multilayer stretch film of claim 15, further comprising a core layer between the two outer layers.

18. The multilayer stretch film of claim 15, wherein the polyethylene comprises linear low density polyethylene.

19. The multilayer film of claim 15, wherein the blend comprises about 3.5–5.5% by weight of the ethylene-propylene copolymer.

20. The multilayer film of claim 15, wherein the ethylene-propylene copolymer has a polydispersity index of about 2.9–10.

21. The multilayer stretch film of claim 15, wherein the ethylene-propylene copolymer tackifier has an ethylene content of 20–28% by weight.

22. The stretch film of claim 15, wherein the blend comprises about 3–6% by weight of the ethylene-propylene copolymer tackifier.

23. The multilayer stretch film of claim 15, wherein each of the outer layers comprises a blend of polyethylene in combination with an ethylene-propylene copolymer tackifier having an ethylene content of about 15–28% by weight and a weight average molecular weight of about 7000 to about 18,000.

24. The multilayer stretch film of claim 23, wherein the ethylene-propylene copolymer tackifier in each layer has a weight average molecular weight of about 7000 to about 12,000.

25. The multilayer stretch film of claim 23, further comprising a core layer between the two outer layers.

26. The multilayer film of claim 23, wherein the polyethylene in each of the outer layers comprises linear low density polyethylene.

27. A process of making a low noise stretch film, comprising the steps of:

combining polyethylene with an ethylene-propylene copolymer tackifier having an ethylene content of 15–28% by weight and a weight average molecular weight of about 7000 to about 18,000, to form a blend;

forming a film from the blend;

allowing the tackifier to bleed to a surface of the film; and winding the film into a roll.

28. The process of claim 27, wherein the ethylene-propylene copolymer tackifier has a weight average molecular weight of about 7000 to about 12,000.

29. The process of claim 27, wherein the ethylene-propylene copolymer tackifier has an ethylene content of 20–28% by weight.

30. The stretch film of claim 27, wherein the blend comprises about 3–6% by weight of the ethylene-propylene copolymer tackifier.

* * * * *